United States Patent
Serra et al.

(10) Patent No.: US 7,412,879 B2
(45) Date of Patent: Aug. 19, 2008

(54) METHOD FOR MONITORING TYRE DEFORMATIONS AND MONITORING SYSTEM THEREFOR

(75) Inventors: Stefano Serra, Milan (IT); Antonio Carrus, Milan (IT); Chiara Cipriani, Milan (IT); Enrico Albizzati, Milan (IT); Renato Caretta, Milan (IT)

(73) Assignee: Pirelli Pneumatici S.p.A., Milan (IT)

(*) Notice: Subject to any disclaimer, the term of this patent is extended or adjusted under 35 U.S.C. 154(b) by 0 days.

(21) Appl. No.: 10/569,196

(22) PCT Filed: Sep. 19, 2003

(86) PCT No.: PCT/EP03/10505

§ 371 (c)(1),
(2), (4) Date: Oct. 5, 2006

(87) PCT Pub. No.: WO2005/028270

PCT Pub. Date: Mar. 31, 2005

(65) Prior Publication Data

US 2007/0151334 A1    Jul. 5, 2007

(51) Int. Cl.
*G01M 17/02* (2006.01)
(52) U.S. Cl. .................. 73/146; 73/146.5; 340/442; 340/445
(58) Field of Classification Search ........ 73/146–146.8; 340/442–447
See application file for complete search history.

(56) References Cited

U.S. PATENT DOCUMENTS 5,670,877 A    9/1997   Scheiber
5,964,265 A   10/1999   Becherer
6,404,182 B1   6/2002   Kawase et al.
6,959,592 B2 * 11/2005   Caretta ................... 73/146
6,973,824 B2 * 12/2005   Giustino et al. ........... 73/146
7,026,977 B2 *  4/2006   Reindl .................... 342/71
7,185,532 B2 *  3/2007   Giustino et al. ........... 73/146
7,249,498 B2 *  7/2007   Miyoshi et al. ............ 73/146
7,257,997 B2 *  8/2007   Miyoshi et al. ............ 73/146

FOREIGN PATENT DOCUMENTS

| EP | 0 928 680 A1 | 7/1999 |
| WO | WO-00/35666 | 6/2000 |
| WO | WO-01/94168 A1 | 12/2001 |

* cited by examiner

*Primary Examiner*—Andre J. Allen
*Assistant Examiner*—Jermaine Jenkins
(74) *Attorney, Agent, or Firm*—Finnegan, Henderson, Farabow, Garrett & Dunner, L.L.P.

(57) ABSTRACT

A method for monitoring deformations in a tire of a vehicle wheel, the wheel including the tire and a rim, the method including: providing the wheel with at least two magnetic-field emitters mutually disposed so as to yield a composite magnetic field having one or more space portions where at least one component of the composite magnetic field is substantially null; disposing at least one main magnetic-field sensor substantially in one of the one or more space portions; monitoring variation of the at least one component of the composite magnetic field; and correlating the variation with tire deformations. At least one of the magnetic-field emitters is disposed in contact with the tire. A system for monitoring deformations in a tire of a vehicle wheel includes the wheel, the at least two magnetic-field emitters, and the at least one main magnetic-field sensor.

39 Claims, 10 Drawing Sheets

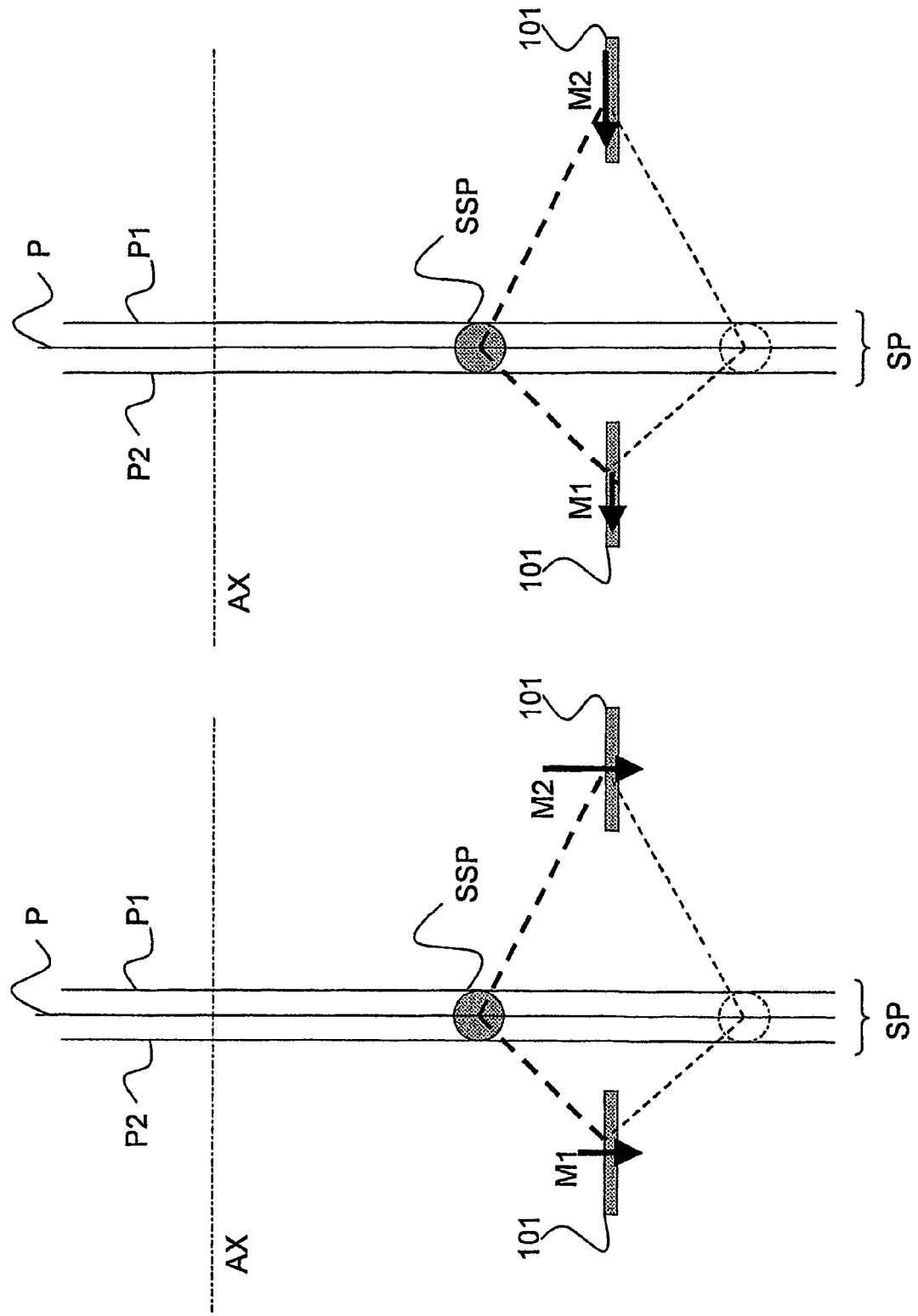

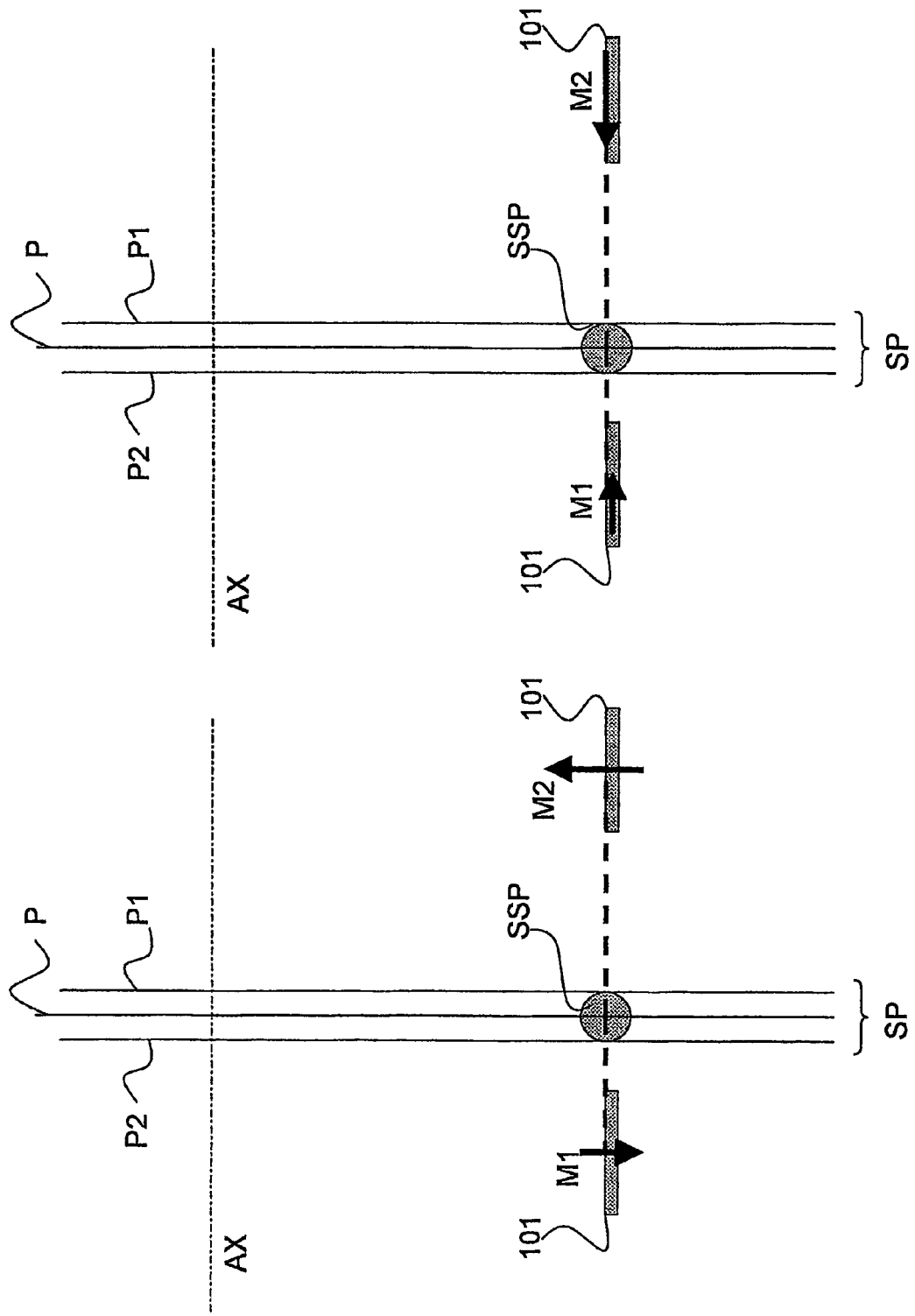

METHOD FOR MONITORING TYRE DEFORMATIONS AND MONITORING SYSTEM THEREFOR

CROSS-REFERENCE TO RELATED APPLICATIONS

This application is a national-phase entry under 35 U.S.C. § 371 from International Application No. PCT/EP2003/010505, filed Sep. 19, 2003, in the European Patent Office, the content of which is relied upon and incorporated herein by reference.

BACKGROUND OF THE INVENTION

1. Field of the Invention

The present invention relates to a method for monitoring tyre deformations and to a corresponding monitoring system.

2. Description of the Related Art

As it is known, tyre deformations are induced by the interplay of lateral or longitudinal forces produced by the motion itself of a motor vehicle and friction of tyres with the road. Deformations represent a viable way for monitoring, relevant parameter such, as slipping angles, flattening and, generally speaking, variations in the footprint area of a tyre, which control the adhesion and friction of a tyre with the road. In turn, such detected information can be useful to prevent critical situations; thus improving the whole safety level of vehicles.

A number of different systems and methods have been proposed for measuring the tyre deformations. These methods are based upon direct measures of twisting forces or upon coupling of suitable signal generators with sensors capable to measure these signals.

Among them, magnetic systems (see, for instance; EP 1 289 813, and U.S. Pat. No. 5,964,265) have been proposed.

EP 1 289 813 (in the Applicant's name) discloses a system for monitoring the shear deformations of a crown portion of a tyre during the running of a motor vehicle. It comprises at least one magnetic field (hereinafter also referred to as MF) generator, preferably a strip of magnetic material applied to the tyre, and at least a sensor strip measuring the MF variations of said MF generator. Each magnetic generator generates a magnetic field of intensity which is detected by the corresponding magnetic induction sensor. The monitoring of the tyre deformations is effected by measuring the variation in time of the magnetic field produced by the MF generator during the running.

U.S. Pat. No. 5,964,265 (in the name of Continental Aktiengesellschaft) discloses a system for determining tyre-road adhesion. The system is composed by a subsystem, for generating data comprising a magnetic sensor and a magnetic field produced by partial magnetization of the belt in radial direction. Such belts can contain ferromagnetic powders to increase the MF produced. The sensors are, placed within the tread.

U.S. Pat. No. 6,404,182 (in the name of Canon Denshi) discloses a system for detecting the revolution of tyres using a magnetic field. In an embodiment the tyre steel belts performs as MF generator, being, uniformly magnetized in a direction for a portion, of the circumference and in the opposite direction for the other portion of the circumference. Another embodiment consists in providing a magnetic member inside the wheel. The magnetic field generated, for example, by the magnetized steel belt is detected by two magnetic detection elements, which are set so that the magnetic field detection directions of the twos magnetic detection elements are parallel to the side surface of the tire, and the two elements are juxtaposed in a direction perpendicular to the side surface of the tire. Said detection elements are provided in the vicinity of the tyre, in a fixed position, for example on the side of a seat.

U.S. Pat. No. 5,670,877 (in the name of Hughes Electronics) discloses a method and apparatus for sensing rotation of shafts. It comprises two magnetic sensors disposed with respect to a rotating magnetic source, which is integral with the shaft itself, to sense the MF components, that are generated. The magnetic generator is a magnet positioned along a part of the shaft with a north and south pole. Under rotation of the shaft a waveform signal is produced with a periodically variable magnetic field. Measuring the period of revolution and the variation of these periods results in information on the acceleration and velocity during the shaft revolution. Possible applications are ABS systems.

The systems disclosed by the above mentioned documents provide partial information about the deformation of a tyre.

In the case of U.S. Pat. No. 6,404,182 and U.S. Pat. No. 5,964,265 the magnetization of the steel belt of the tyre can provide information about deformation just in running conditions. Analogous consideration may be applied to U.S. Pat. No. 5,670,877.

Also in the case of EP 1 289 813 the information collected is not satisfactory. The system therein disclosed is based on MF generator/sensor units operating independently from one another, i.e. each sensor detects MF variation from a single generator. This results in a mono-dimensional, reading of the magnetic field because only the intensity modulus, is measured.

SUMMARY OF THE INVENTION

Applicant perceived that the need for a method and system for monitoring the deformations of a tyre being sensitive; and reliable, thus capable of detecting even small deformations, advantageously in the three spatial directions, was still felt. Also, such a system and method should be simple and easy to be manufactured/performed.

Applicant found that an effective monitoring of the tyre deformations can be achieved by measuring the vectorial components of a composite magnetic, field associated to the tyre and establishing a simple relation, for example a linear or quadratic relation, between MF vectorial variations and tyre deformations. A method for measuring the MF vectorial components was found based on detecting the state of a composite magnetic field generated by at least two emitters.

In a first aspect the present invention relates to a method for monitoring deformations in a tyre of a vehicle wheel, the wheel comprising the tyre and a rim, the method comprising the steps of:

a) providing the wheel with at least two magnetic field emitters in mutual positions so as to yield a composite magnetic field having at least a space portion where at least a component of the composite magnetic field is substantially null, at least one of the at least two magnetic field emitters being positioned in contact with the tyre;

b) positioning at least one main magnetic field sensor substantially in said space portion;

c) monitoring variation of said at least a component of the composite magnetic field by means of said at least one main magnetic field sensor; and d) correlating said variation with tyre deformations.

For the purposes of the present invention, "composite magnetic field" means a magnetic field resulting from the interaction of the magnetic fields generated by at least two MF emitters.

The method according to the invention is based on the displacement of the composite magnetic field (MF) space portion wherein at least one component of said MF is substantially null.

As at least one of the MF emitters is positioned in contact with the tyre, tyre deformations move such emitter and, as a consequence, produce said displacement.

The at least one main sensor positioned in said space portion detects changing of the at least one MF component, which is related to the deformation of the tyre, by, for example, a linear or quadratic relation.

More preferably such space portion includes a special space portion (SSP) which is a sub-portion where all the components of the magnetic field are substantially null, and the at least one main sensor (hereinafter also referred to as "main MF sensor" or "main sensor") is therein positioned.

Preferably, the method of the invention provides monitoring of the tyre deformations in the three spatial directions.

The detection sensitivity is higher and more reliable than that of the known systems in view of various features, for example, the mutual positioning of the at least two emitters of magnetic field and the at least one main sensor, said positioning being substantially triangular. Such positioning yields a composite magnetic field distributions varying in the three spatial directions around the space portion where the main sensor is substantially located. Also, variations of the MF components are expressed by simple linear or quadratic laws as a function of the relative displacement of at least one of the at least two MF emitters, which is caused by the tyre deformation. Hence, the deformations can be effectively monitored in one or, preferably, all of the three spatial direction (lateral, longitudinal or vertical). The magnetic field variations are monitored by the main magnetic sensor whose response is typically unisotropic and linear with the magnetic field. Measuring variations of said magnetic field components results in detecting and monitoring the corresponding deformations which induce, such variation in terms of the relative displacement of the magnetic field emitters with respect the main sensor.

In another aspect the present invention relates to a system for monitoring deformations in a tyre of a vehicle wheel comprising:

a) a wheel including the tyre and a rim;

b) at least two emitters of magnetic-field positioned in the wheel in mutual positions, so, as to yield a composite magnetic: field having at least a space portion where at least a component of the composite magnetic field is substantially null, at least one of the at least two magnetic field emitters being positioned in contact with the tyre;

c) at least one main magnetic field sensor placed substantially in said space portion.

Preferably, at least one of the at least two emitters of magnetic field (hereinafter also referred to as "MF emitters" or "emitters") is positioned in the crown portion of the tyre.

Preferably, at least one of the at least two MF emitters is placed in a radial internal position with respect to any tyre metal structure, typically the belt or the carcass. For example, it can be applied on the liner. Another emitter of magnetic field can be placed on the rim.

Preferably, at least two emitters are positioned in contact with the tyre.

Preferably, the at least two emitters of magnetic field are elongated elements, for example in form of tapes, disposed substantially along a circumference of the wheel. Each of the MF emitters can be either in a single piece or in multiple pieces.

For example, an MF emitter can be about 1-3 cm large. It can be about 0.1-0.3 cm thick.

An MF emitter can be made up of tapes (for instance about 10-20 cm long), which can be aligned or juxtaposed to form a longer tape. This solution is preferred for adapting the MF emitter to any kind of tyre size.

Advantageously, the MF emitters are manufactured by extrusion of vulcanizable blends including at least a magnetic or magnetizable material, for example a powder.

Preferably, the MF emitters are, made directly on the tyre during the manufacturing thereof, the whole assembly being vulcanized thus fixing the MF emitters in the tyre, and finally the magnetic field emitters are magnetized according to known methods, for example by using a solenoid or a magnet.

More preferably, the magnetic field emitters are provided in the tyre during a manufacturing process wherein at least one element of the tyre is built-up by depositing, for example by extrusion, an elongated element in raw elastomeric material according to a predetermined path.

A work station suitable for such manufacturing process comprises a robotized arm, preferably of anthropomorphic type. Preferably such robotized arm maneuvers a substantially toroidal rigid support where the deposition of the elongated element is effected. Reference is made to patent applications WO 00/35,666 and EP 0,928,680 in the Applicant's name that are incorporated herein by reference.

In another embodiment, MF emitters and tyre are prepared and vulcanized separately, then the emitters are magnetized and successively fixed upon the tyre with suitable means, for example with an adhesive material or a low temperature cross-linkable rubber.

In a further embodiment, already magnetized emitters are extruded in a green tyre or applied thereupon, then the whole is vulcanized.

Advantageously, the at least two magnetic field emitters are made of magnetic rubbers comprising a polymer or a polymer blend, and at least a magnetic material.

Preferably, said polymer or polymer blend has an elastic modulus at least 10% lower than the elastic modulus of the liner. They can be selected from halogen-butyl rubbers, for, example halogenated isobutylene-isoprene (IIR) rubber.

The at least a magnetic material can be present in the magnetic rubber in an amount: ranging from about 50 to about 400 phr.

The at least a magnetic material can be hard magnet material, for example NdFeB, NdPrFeB, SmCo, Alnico 5, and Alnico 9.

Magnetic materials having an isotropic, magnetization are preferred.

Magnetic materials with an intrinsic coercitivity of at least 100 kA/m are preferred in order to prevent accidental demagnetization of tapes and instability with time. For instance, NdPrFeB has an intrinsic coercitivity ($Hc_j$) of 740 kA/m. Nevertheless, use of less coercitive materials like Alnico 5, which have typically a $Hc_j$ of about 50 kA/m, is acceptable especially in combination with a magnetic lens, as discussed hereinbelow.

Preferably, the at least a magnetic material has a residual induction (Br) higher than 0.6 T (Tesla). This characteristic allows lower amount of magnetic material present in the magnetic rubber, thus improving mechanical properties of the emitters and, in the case, the compatibility with other tyre materials.

Preferably, the at least a magnetic material has a Curie temperature (the temperature above which a ferromagnetic material loses its permanent magnetism) significantly greater than the temperature of use of the tyre. The Curie temperature should be significantly greater than the manufacturing temperature of the tyre, when the MF emitters are built in the tyre in a magnetized form. Advantageously, the Curie temperature is greater than 300° C.

The MF emitters can be magnetized uniformly or a magnetization modulation can be induced, for example, through a different intensity and/or direction magnetization. When an MF emitter is composed by more than one piece, each piece could be magnetized as the others or a magnetization modulation could be induced, for example through a different intensity and/or magnetization direction of each piece.

The MF emitters can generate, a composite magnetic field having an intensity ranging, for example, from about 0.01 G to about 10 G (gauss).

The method and system, of, the present invention can advantageously comprise at least a magnetic lens. Said magnetic lens can be useful to deflect the composite magnetic field generated by the MF emitters so as to "concentrate" the composite magnetic field in a radially internal direction. Moreover the magnetic lens may provide a screen from external magnetic fields The magnetic lens can be placed in a circumferential and radially external position with respect to the MF emitters, and in radially internal position with respect to any tyre metal structure.

The magnetic lens comprises soft magnetic material characterized by low values of coercive field, for example, equal or lower than 80 A/m. Examples of soft magnetic materials are soft ferromagnetic materials, e.g. pure iron, permalloy and supermalloy.

Such soft magnetic material can be mixed in rubber material. Preferably the amount of said soft magnetic material is of about 50-100 phr, more preferably 10-30 phr.

A magnetic lens can be provided for each emitter, being wider than it. Preferably a single magnetic lens, suitably wide, is provided for the at least two magnetic field emitters.

The thickness of the magnetic lens can be of at least 0.05 cm, for example of about 0.1-0.5 cm.

The magnetic lens can be produced in manners analogous to those described for the magnetic field emitters.

Preferably the at, least one main magnetic field sensor, is positioned in a non rotating portion of the wheel.

Preferably, said at least one main sensor is positioned substantially in a space portion, where all the components of the composite magnetic field are substantially null. More preferably, it is positioned in a special space portion as described above.

The method and the system of the present invention may further comprise at least a secondary magnetic field sensor. This secondary sensor is useful for monitoring magnetic signals deriving from sources other than the at least two magnetic field emitters, and subtracting them from the reading of the main sensor.

A secondary sensor can be located at least 20 cm far from the at least a main sensor. This positioning is advantageous for removing signals induced by the terrestrial magnetic field.

Alternatively or additionally, a secondary sensor can be located at a distance smaller than 3 cm from the corresponding at least a main sensor. This positioning is advantageous for removing signals induced by metal portion, for example, of the wheel or of the tyre itself.

Preferably, secondary sensors are provided in both the just above mentioned configuration.

A single secondary sensor can be provided for multiple main sensors.

Each main and secondary sensor can be either monoaxial, bi-axial or, tri-axial, i.e. receptive to one, two, or three components of the MF parallel to the active axes of the sensor itself. Preferably, said secondary sensor is oriented substantially analogously to the corresponding main sensor/s. Preferably said secondary sensor is positioned on a non-rotating portion of the wheel.

Both the at least one main sensor and the optional at least a secondary sensor can be, positioned in a radially internal position with respect to the tyre. Possible convenient locations could be the steering gear or shock absorber block or the braking block of the vehicle.

The at least one main magnetic sensor and the optional, at least a secondary magnetic sensor can be; commercially available magnetic sensors like Hall or fluxgate sensors, or, preferably, linear magnetoresistive sensors.

The system of the invention can be connected to on-board computers or other electronic equipments of the vehicle via electronic means. Examples are illustrated in the patent application WO99/29522.

Advantageously, the method and system according to the present, invention can be used to monitor any kind of tyre deformations, i.e. lateral deformations, vertical deformations and longitudinal deformations. These deformations can be monitored separately or as a whole. They can be used to monitor the dynamic motion of tyre, its accelerations and deceleration.

Examples of lateral deformations are those resulting during the cornering of vehicle (shears) which induce slipping and lost of adherence.

Examples of vertical deformations are those resulting from the degree of the flattening or from the lifting-up of the vehicle.

Examples of longitudinal deformations are those resulting from the vehicle braking, acceleration or deceleration.

BRIEF DESCRIPTION OF THE DRAWINGS

The present invention will be further illustrated hereinafter with reference to the following examples and figures, wherein:

FIGS. 10A-D are schematic representations of different magnetization embodiments of the system according to the present invention.

DETAILED DESCRIPTION OF THE EXEMPLARY EMBODIMENTS

Figure 1:
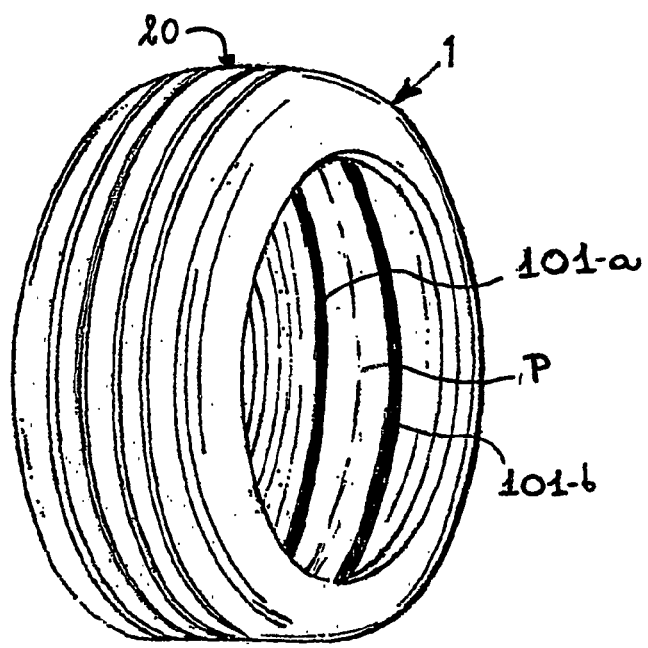
FIG. 1 is a perspective view of a tyre part of a system according to the present invention.
Figure 2:
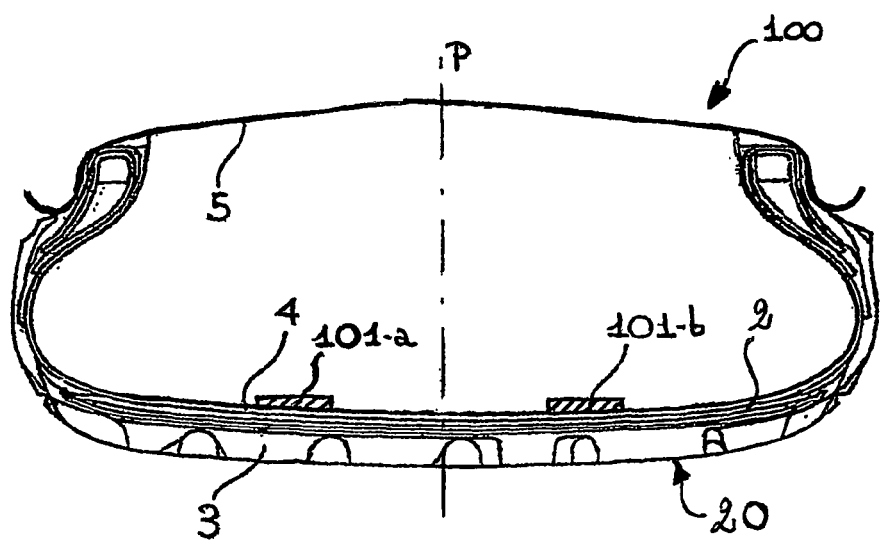
FIG. 2 is a cross-sectional view of the tyre of FIG. 1 mounted on a rim.

FIGS. 1 and 2 show a tyre 1 for a motor vehicle having a carcass 2 and a crown 20 comprising a tread 3 in its radially outer part. A liner 4 is provided in its radially inner part. The tyre 1 is fitted on a rim 5 (partially shown in FIG. 2).

According to the present invention, tyre 1 is part of a system 100 for monitoring its deformation.

Figure 3:
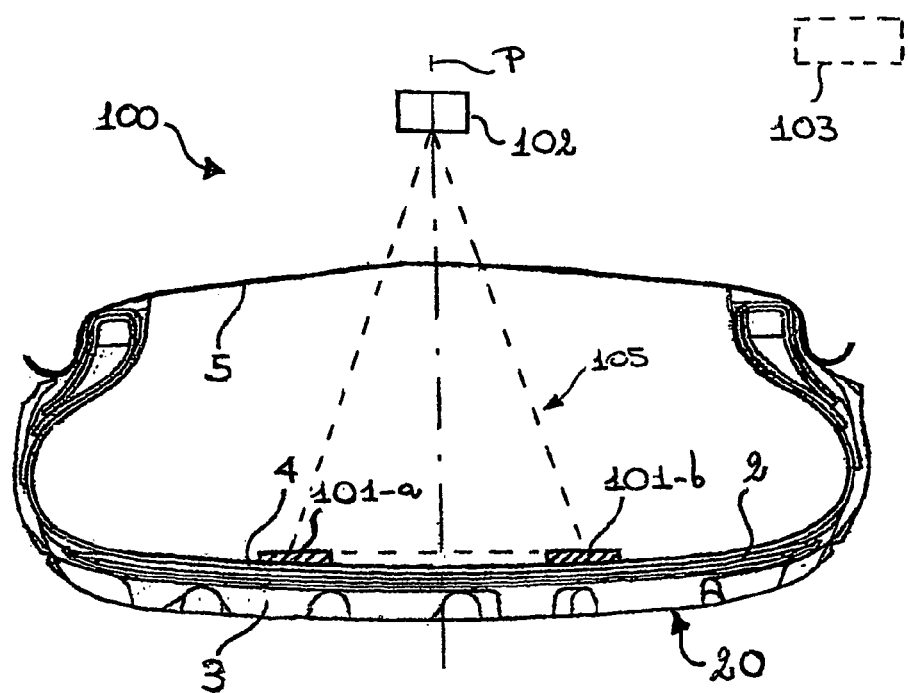
FIG. 3 is a schematic view of a first embodiment of the system according to the present invention.
Figure 4:
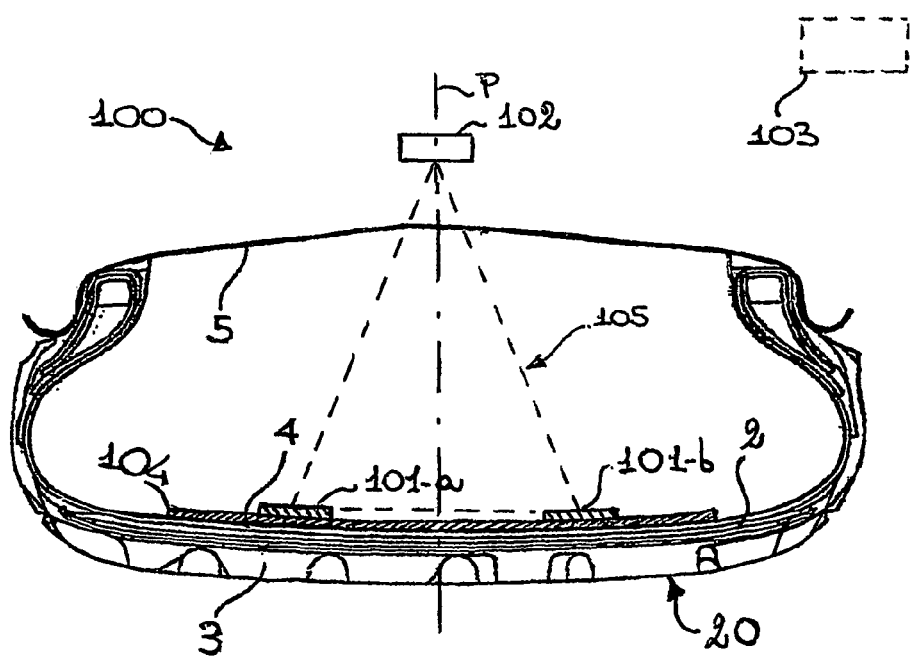
FIG. 4 is a schematic view of a second embodiment of the system according to the present invention.

In the embodiments depicted in FIGS. 3 and 4, the system 100 comprises two, magnetic field emitters 101-a,b on liner 4 of the tyre 1 and a main sensor 102 for the composite magnetic field (not illustrated) generated by said emitters 101-a,b.

The two magnetic field emitters 101-a,b are tapes of composite, magnetic rubber arranged substantially circumferentially on the liner 4 as shown in FIGS. 1-4.

The system 100 comprises a main sensor 102 and, optionally a secondary sensor 103 differently located, as, shown in FIGS. 3 and 4. In the embodiment depicted by these figures, the main sensor 102 is symmetrically located with respect to the emitters 101-a,b providing a triangular arrangement 105. In FIG. 4 a magnetic lens 104 is shown.

Figure 8:
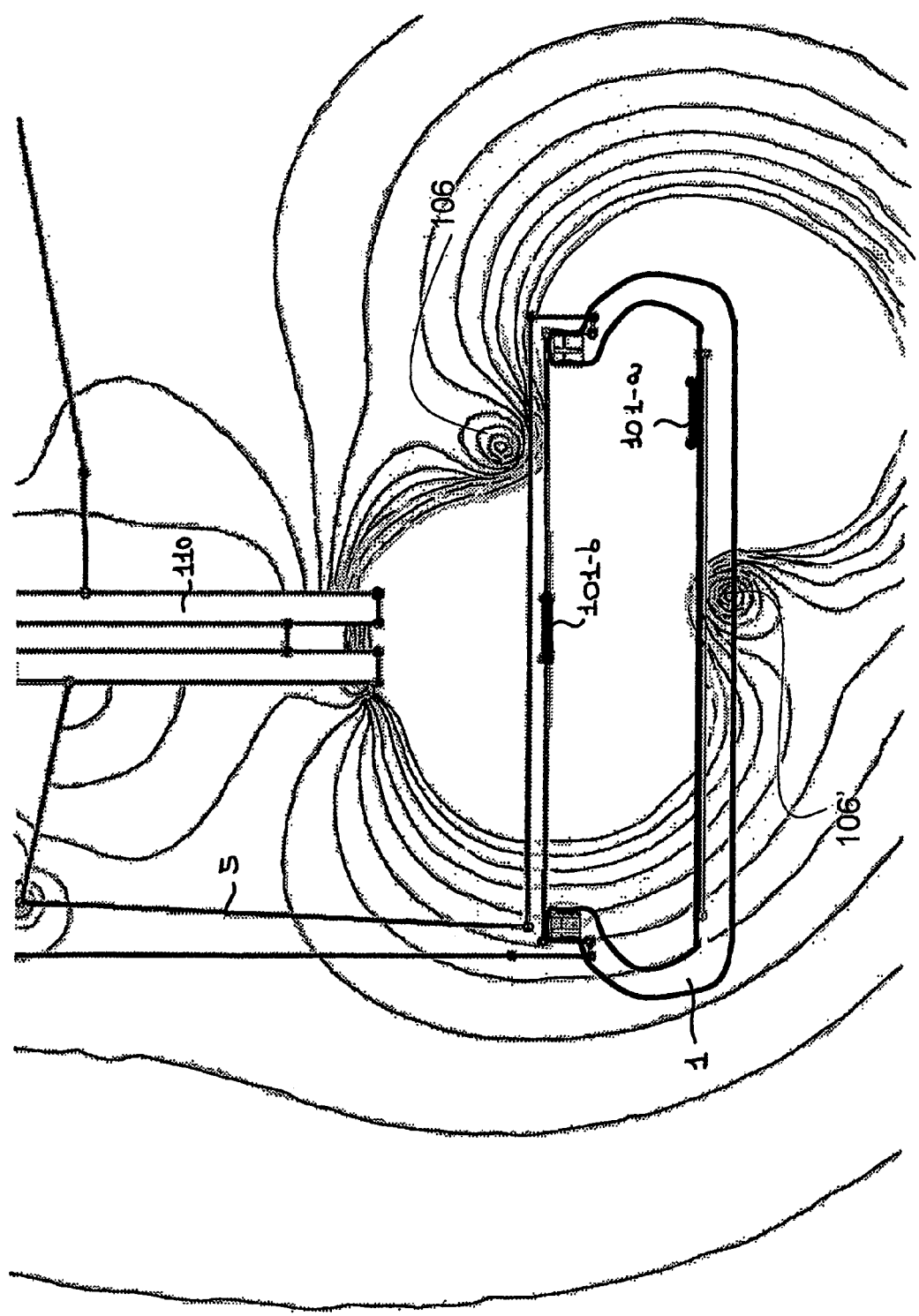
FIG. 8 is a schematic view of a third embodiment of the system according to the present invention.

In the embodiment shown in FIG. 8, a first MF emitter 101-a is arranged on the tyre and a second emitter 101-b is arranged on the rim.

In this figure, two space portion 106, 106' are illustrated. The main sensor (not shown for sake of clarity) is arranged in the special space portion 106, for instance by connecting it to a bracket or the like connected to a non rotating portion of the vehicle, for instance the braking block 110.

Figure 9:
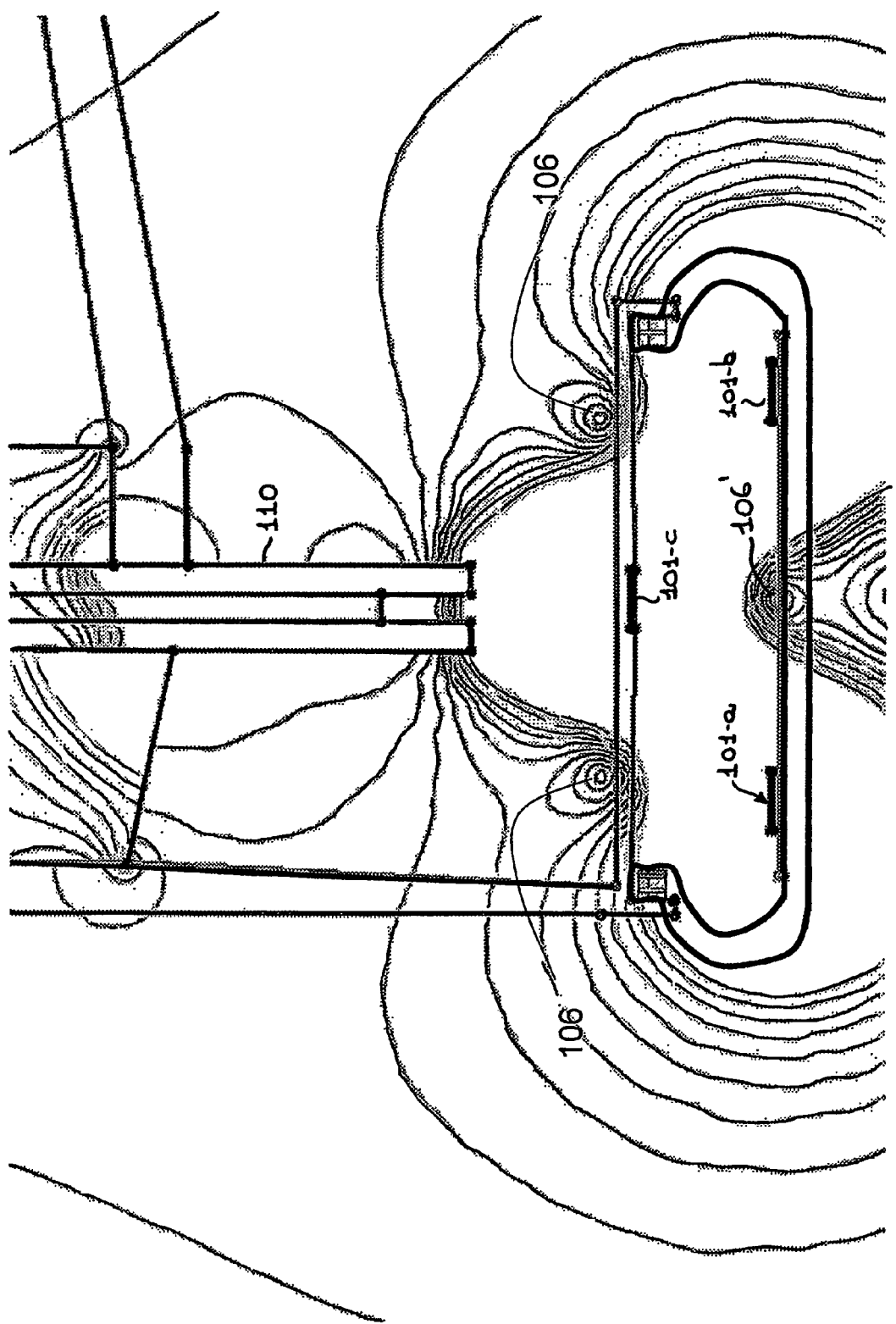
FIG. 9 is a schematic-view of a fourth embodiment of the system according to the present invention.

In the embodiment of FIG. 9, two MF emitters 101-a,b are symmetrically arranged on the tyre and a third MF emitter 101-c is arranged on the rim. Such an arrangement provides two space portions 106 near the rim, and a third space portion 106' on the tyre. A main MF sensor (not shown for sake of clarity) can be arranged in either one of the space portions 106, again by a bracket or the like connected to a non rotating portion of the vehicle, for instance the braking block 110.

An optimal location for the MF sensor 102 can be selected considering one or more of the following features: the mutual distance and positioning of the magnetic field emitters 101, the presence of the magnetic lens 104 which can be provided under the two emitters 101-a,b (as from FIG. 4) or embedded under the liner, the magnetization characteristics of the MF emitters.

In the present description as "radial component" is meant the composite magnetic field component directed radially to the tyre, i.e. perpendicular to the crown portion of the tyre. It corresponds to a vertical deformation of the tyre. As "axial component" is meant the composite magnetic field component parallel to the crown portion of the tyre and orthogonal to the vehicle running direction. It corresponds to a lateral deformation of the tyre. As "longitudinal component" is meant the composite magnetic field component parallel to the crown portion of the tyre and to the vehicle running, direction. It corresponds to a longitudinal deformation of the tyre.

According to the above conventions, an uniaxial main sensor can be useful for pressure or vertical load sensing purposes and can be oriented for measuring the radial component of the composite magnetic field.

A biaxial main sensor can be suitable for measuring, for example, radial and axial components of the composite magnetic field, the measuring of the variations of said components being useful for monitoring deformations of the tyre running along a bend. The measuring of the radial and longitudinal components can be useful for monitoring deformations of a tyre while braking.

A triaxial main sensor provides a three-dimensional monitoring of the tyre deformation.

The contextual measure of magnetic field components, especially in case of lateral tyre deformations involving displacements of the at least a magnetic field emitter in the crown portion of the tyre with respect to the sensor, provides a complete and reliable monitoring of the tyre status.

The method and system according to the present invention allows to establish a univocal relationship between variations of the MF components and change of position of the emitter/s with respect to the sensor.

For example, in the case of lateral deformations, the axial and radial components of the composite magnetic field in the position where the at least a main sensor is locate are known and indicated as $B_{radial}$, $B_{axial}$. When a deformation occurs, the sensor measures different value for the axial and radial components, $B^c_{radial}$, $B^c_{axial}$, respectively. The following two equation system correlates components $B_{radial}$, $B_{axial}$ with $B^c_{radial}$, $B^c_{axial}$ $$\begin{cases} B^C_{radial} = B_{radial}(d_{radial}, d_{axial}) \\ B^C_{axial} = B_{axial}(d_{radial}, d_{axial}) \end{cases}$$

wherein:

$B^c_{radial}$, $B^c_{axial}$ are the component values measured during deformation;

$B_{radial}$, $B_{axial}$ are the component values of the special point where the at least a main sensor is positioned; and $d_{radial}$, $d_{axial}$ are the relative coordinates of displacement of the at least one emitter.

By inverting the equation system, the relative displacements can be calculated from the values of the magnetic field components. Hence the deformations be determined through the related magnetic field variations.

Figure 11:
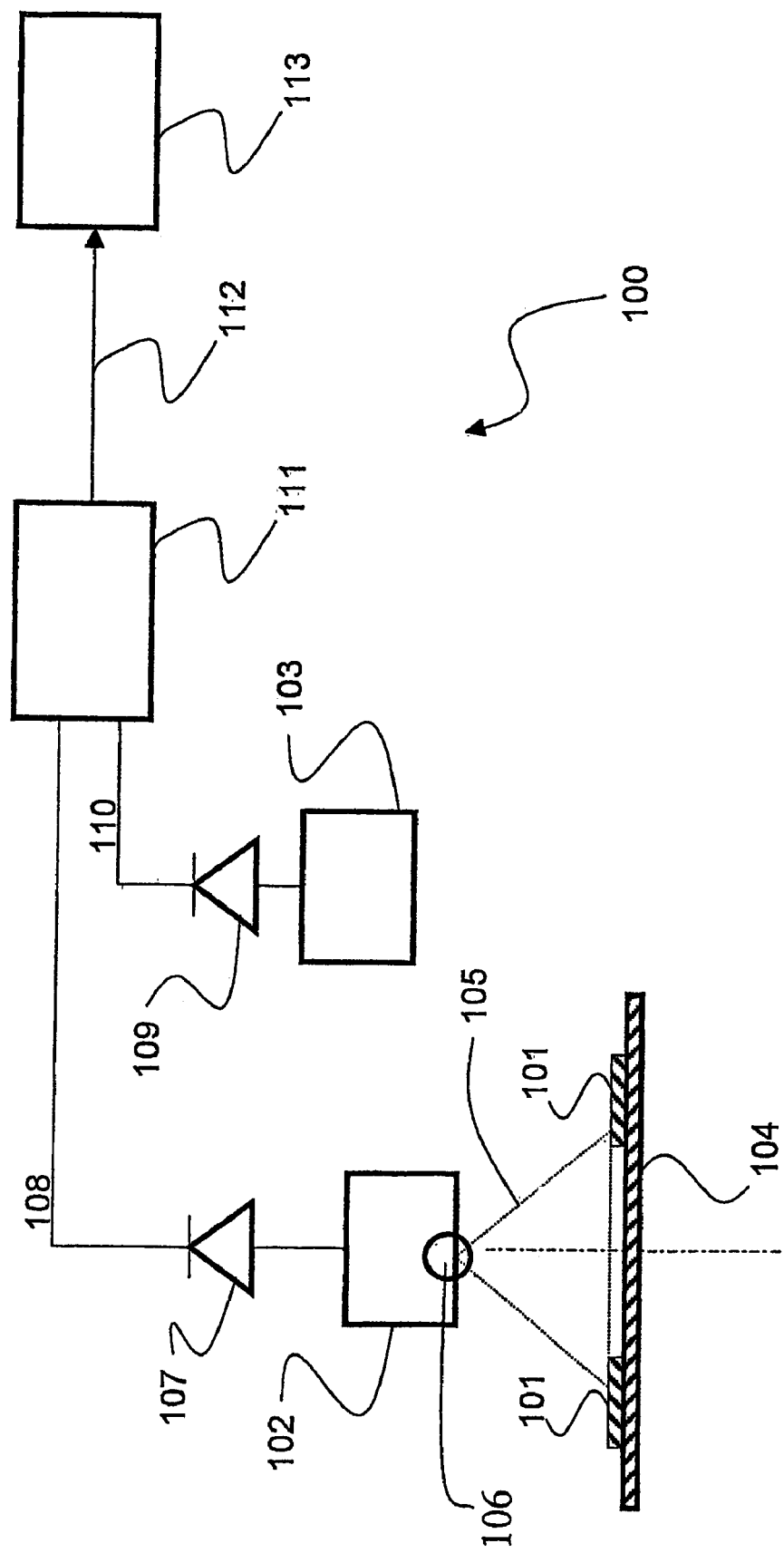
FIG. 11 is a block diagram of the whole system according to the present invention.

FIG. 11 shows a block diagram of the main components forming the system 100 according to an embodiment of the present invention. It comprises a sensing stage, an amplification stage, an A/D conversion stage and a processing stage, which represent the four levels of operation of the system itself:

Sensing stage, namely main sensor 102 and, optionally, secondary sensor 103 for instance, magnetoresistive bi-axial sensors by Honeywell, model HMC 1022 or HMC 1052.

Amplification stage, amplifier 107 and, optionally, amplifier 109: standard operational amplifiers, preferably with gain as large as 90.

Digital Conversion, A/D converter 111: an A/D card is used. Advantageously, a 16 bit-40 kHz card can be used but other formats are suitable (8 bits-12 bits, etc.) depending on the compliance requirements of the electronic equipments of the vehicle. Other electronic components can be used, like PIC (Programmable Integrated Circuits) with A/D conversion capabilities.

Processing stage: It comprises, electronic circuits including a processing units like a PIC. A 20 MHz-10 bit model by Microchip was used in the examples of the invention. In this stage, the digital signal from A/D stage is transformed in the corresponding magnetic field variations and is finally transformed in information about the deformations.

The sensing and amplification stages can be carried out by single sensing units comprising a sensing element (sensor) and an amplifier. Optionally they include a Set/Reset circuit to reset the units in case of failure due to, e.g., excess of temperature (for example, higher than 80° C.) or a too high magnetic field (for example, greater than 20 G), or to periodically reset the main and the optional secondary sensor.

According to the present invention, amplification of the signals for the different MF components are divided into distinct channels for each active components of the main sensor (e.g. two for biaxial sensors). A similar unit is provided for all the sensing units, i.e. the main and the optional secondary sensors.

In the embodiment depicted in FIG. 3 where a main and a secondary sensor 102,103 are provided, two signals 108, 110 coming, respectively, from main sensor 102 and secondary sensor 103 enter the A/D card 111 through different channels. For example, in case of biaxial sensors, four different channels of the A/D card will be used for each of the main sensors and the secondary sensors. In the case of a four-wheeled vehicle wherein each wheel has a couple of main/secondary sensor, sixteen channels will be employed, although the use a lower number of reference sensing units, e.g. only one for all the wheels, or at least a couple, one for the front wheels and one for the rear-ones, can be provided.

The signals entering each of the said channels are digitalized separately and transformed in the processing units into MF, exploiting the linear behavior of the sensing units in the whole interval of frequencies between 0 and 20 kHz.

Once this step is completed, in case a secondary optional sensor is provided, the MF component reading coming from the main sensors and the optional secondary sensor are subtracted in order to keep only the contribution from the deformations of tyres. Finally, the signals are converted in information about tyre deformations by exploiting the algorithms previously outlined for the region around the special point. This can be done both by the PIC (or A/D Card) thanks to the simple laws describing the changes of MF components, which in turn are consequence of the triangulation scheme, or can be subsequently done by a microprocessor. In any case the signals are ready to be used by a microprocessor 113 controlling the flux of data to monitor the status of the vehicle in real time, for example process during a braking in ABS systems.

EXAMPLE 1

A system according to the invention comprised two tape-shaped MF emitters arranged symmetrically with respect to a main MF sensor, the MF emitters being applied on the liner of a Pirelli Euforia 205/45 R17 tyre. The MF emitters were composed by halogen-butyl rubber and NdPrFeB hard ferromagnetic powders, provided by Magnequench Inc., whose mean particle size was about, 40 μm, in an amount of 200 phr of ferromagnetic part. MF emitters were about 2 cm large, about 0.15 cm thick and $2\pi R$ long, R being the internal radius of tyre-measured at the liner. They were magnetized vertically with respect to the main surface with a MF at saturation as large as 3 Tesla, before placing them inside said tyre.

In order to optimize the disposition of said tapes and their physical parameters, the composite magnetic field of the system was, reproduced by computer simulation using codes based upon Finite Element Method (FEM) applied to Maxwell equations. In particular an Open Source code Femm 3.1 (BerliOS) and commercial code Opera 2D/3D (Vector Field) were employed.

Figure 5:
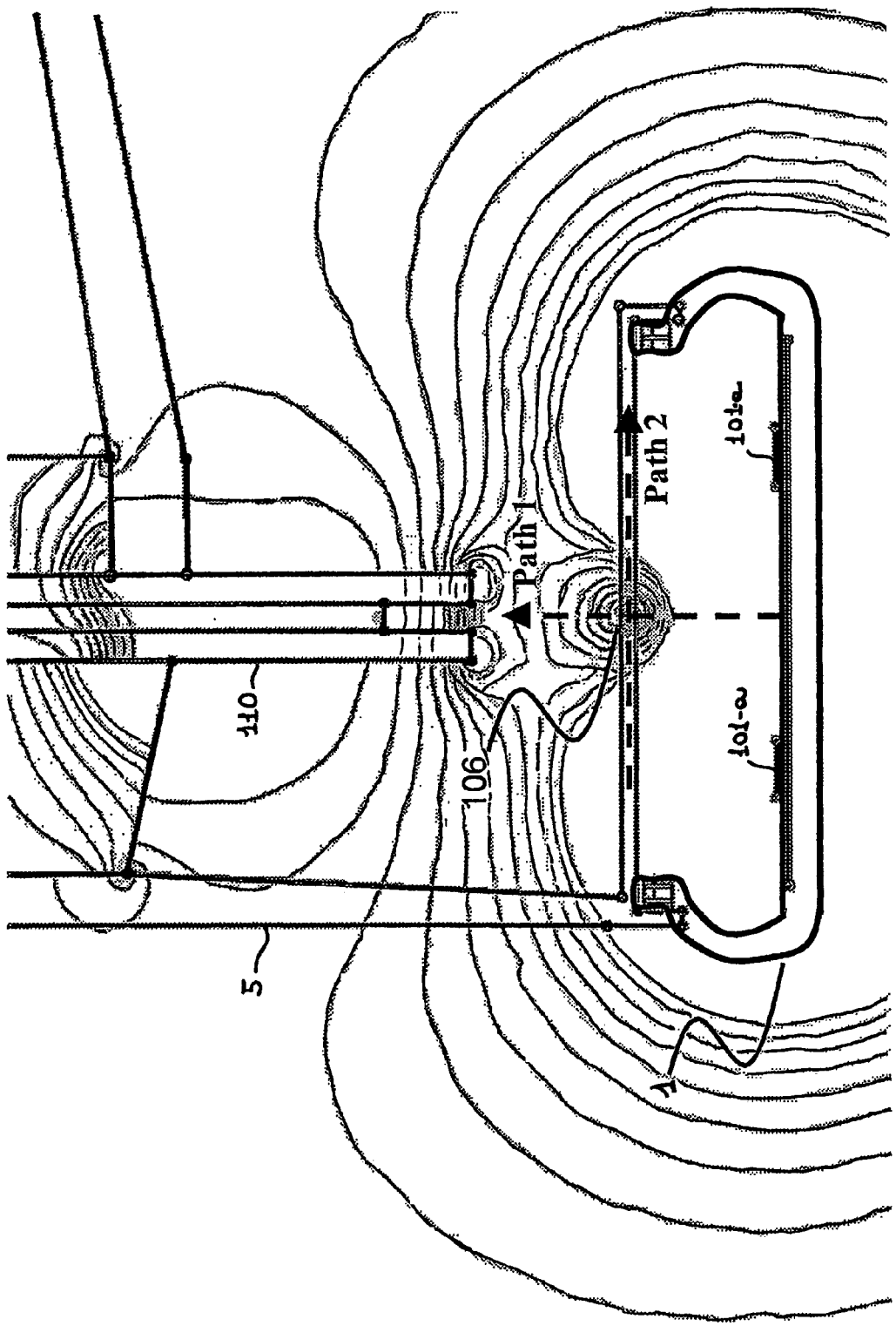
FIG. 5 schematically depicts a composite magnetic field of the invention (example 1)

In FIG. 5 the results of the simulation are shown (FIG. 5 representing a section of the magnetic field distribution along a plane cutting the tyre in: a frontal direction and passing through the point of contact of tyre with, road). The two tape-shaped emitters were magnetized radially and disposed with parallel magnetization axes. The tapes were circumferentially positioned in radial internal positions with respect to tyre liner and separated by a distance of about 12 cm. Both tapes were symmetrically disposed with respect to the sensor position as shown in FIG. 3 according to the proposed triangulation scheme.

Two symmetric space portion appeared because of the symmetrical disposition chosen. A common visual code was applied in FIG. 5 in order to make more evident the nature of this special points. Level lines represent different values of magnetic fields within the interval 0-5 Gauss. Locally, the magnetic field directions are orthogonal to the tangent line of the line level, therefore information concerning magnetic field vectors is provided by these level line visual code. Region of high density of lines represent regions of high values of variations of the magnetic field, low ones represent regions of low variation. The space portions wherein at least a component of the composite MF is substantially null are encircled by concentric level lines. The presence of symmetry axes around such portions, along with components of the magnetic field substantially null (the vertical component, in the present case) can be easily recognized. Two special space portion SSP 106, 106' were generated where the magnetic flux was substantially null. Referring to FIGS. 10A-10D, such portions SSP are distributed along a circle at the same distance from the center of the tyre 1, owing to the cylindrical symmetry of the arrangement.

Similar effects appeared also in the case of two emitters 10-a,b axially magnetized, and positioned in the same geometry with their magnetization axes parallel. The main difference was a global rotation of the MF components of 90°. It resulted in the space portion 106 depicted FIG. 6 where the main sensor 102 was positioned, and in a space portion 106' (not illustrated), in a radially external position with respect to the tyre. The sensitivity of the sensor upon deformations is high as the MF variations of MF are considerable even for deformations of few centimeters or less, changing completely the MF direction, e.g. from radial to axial or longitudinal (depending upon the deformations involved).

The above equations can be used to count tyre deformations. Under a deformation of the tyre, variation in the geometric symmetry of the system according to the invention (displacement of emitter/s with respect to the main sensor) takes place. Such a displacement can be considered as a rigid displacement of the emitter/s plus minor deformations. Accordingly, a correspondent rigid shift of the magnetic field produced by a portion of the emitter/stapes is expected. The aforementioned quadratic or linear laws, as a function of such relative displacements, should apply to account for MF variations due to the tyre deformations.

Figure 6:
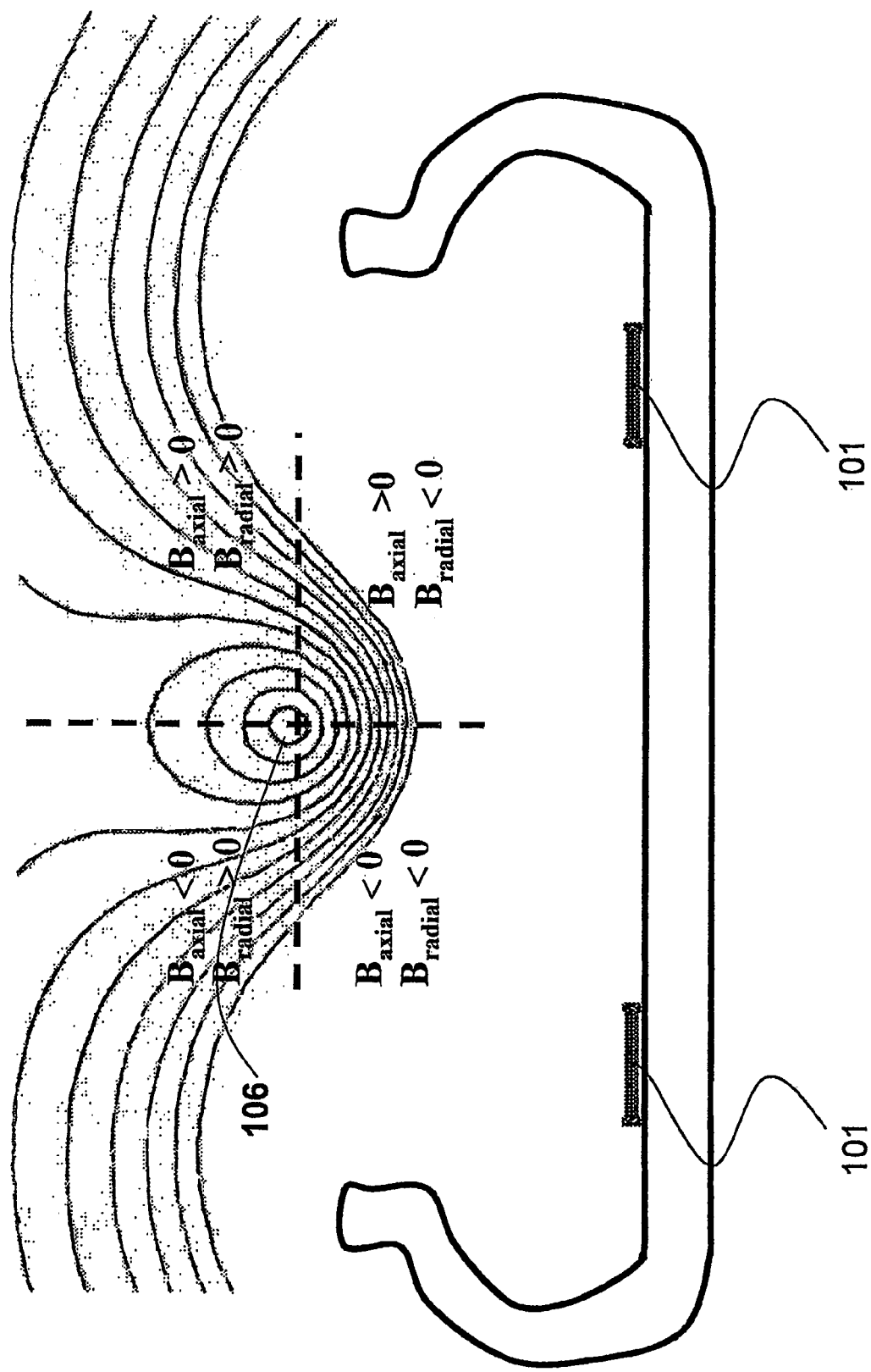
FIG. 6 shows a space portion according to the invention (example 2)
Figure 7:
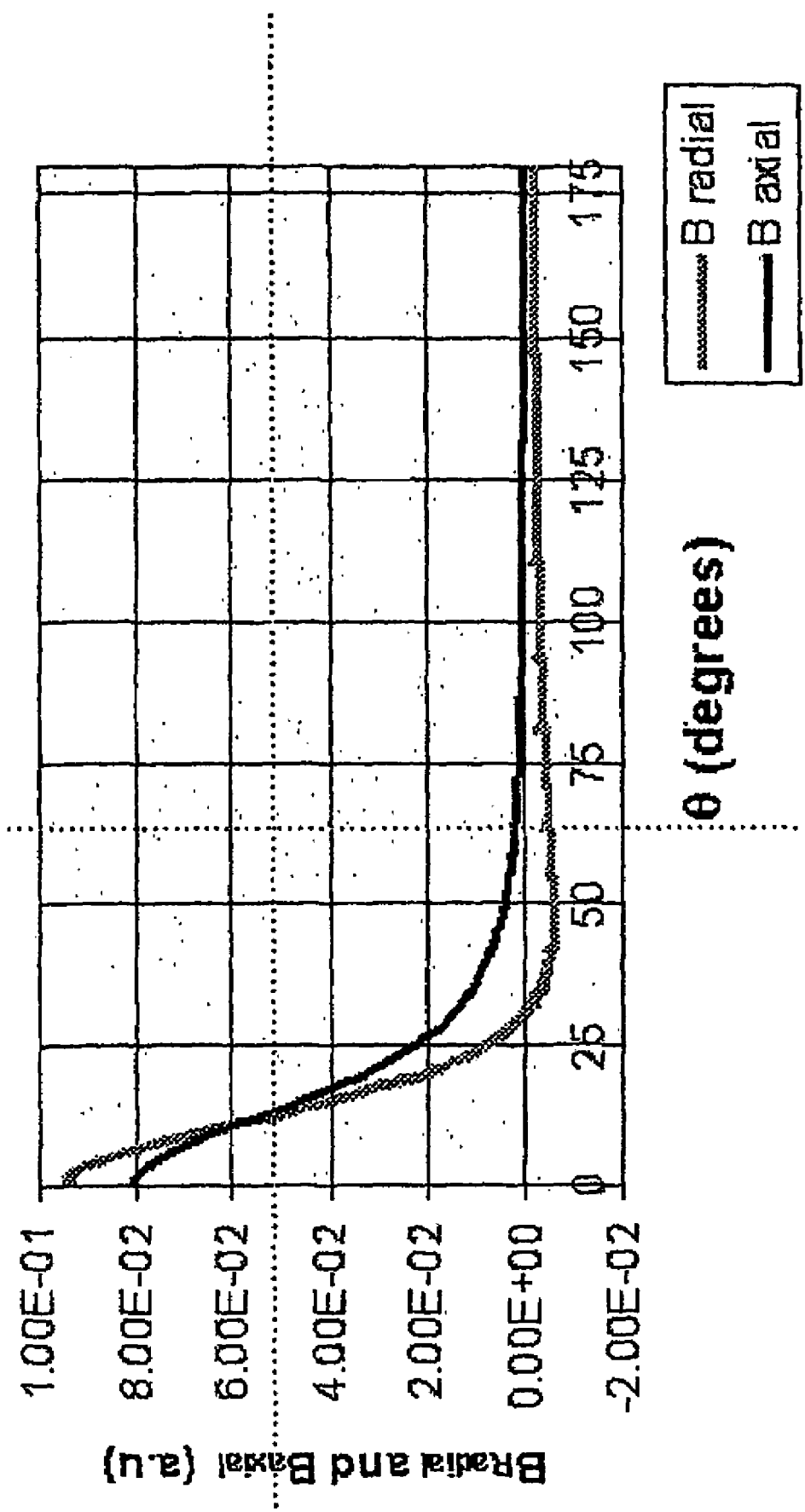
FIG. 7 shows the contribution of magnetic tapes as a function of angle.

FIG. 7 shows the contribution to the MF components measured by the main sensor coming from different portions of the emitters, and assuming angle zero for the portion closer to, the road. The portion between about −20° and +20° is in the footprint area and is substantially the region interested to major distortions. The plot of, FIG. 7 demonstrates the effectiveness, of the scheme of monitoring deformations of the area in contact with the road. Furthermore, as illustrated in FIG. 6, the spatial region around said space portion 106, where the main sensor is positioned, is subdivided in four distinct, areas, each characterized by different signs and values for the MF components. Each deformation (in case of lateral deformations, for example) can be determined univocally measuring at least the axial and radial components of the MF, and inferring, by a suitable algorithm, the correspondent axial and radial displacements that have produced such a MF variation.

The results of the simulations were experimentally verified using the same geometry (distances, dimensions etc.) and magnetization used for the simulations in order to make a comparison. Measures were done using a high precision, gaussmeter F.W. Bell 4048, having a Hall sensor probe with a precision of about ±0.1 G for MF intensities of few Gauss. Experimental values of the displayed components were subtracted of the correspondent value of terrestrial MF in order to make a direct comparison and mimic the effect of sensor 103. The comparison reproduced the theoretically predicted MF distributions around the special space portion 106.

Finally, the thermal stability of magnetization in tape-shaped emitters was tested. No evidence of variations in the magnetization was found even after 24 hours of thermal treatments for each measured temperature. Measures were taken at room temperature after extraction from oven, cooling down the emitters to room temperature and measuring their surface MF. Irreversible losses of few percent (5-10%) were observed only above 150° C., depending on the properties of polymer and, in a minor, amount, on the hard ferromagnet NdPrFeB. No evidence of changes in the magnetization axis was found at any investigated temperature value.

EXAMPLE 2

A test was made substantially analogously to that of Example 1, but using a different tyre, model "PZero Rosso 225/45 R18", and a magnetic lens. This lens was about 0.1 cm thick, 18 cm large, stretching for the whole surface in a radially external position with, respect to the belt. It was made of the halogen butyl rubber of the tape-shaped emitters, and pure iron powders, therein dispersed in a percentage by weight of 20 phr with respect to the rubber. The resulting MF distribution was computed using the same computational tools of example 1, with a similar magnetization and disposition of the tape-shaped emitters, but with a distance between the tape-shaped emitters increased to 14 cm.

Two major changes were observed: first, the number of space portion was reduced to one in the 2D plot of MF distribution, being maintained only that located in a radially internal position with respect to the tyre (corresponding to 106 in FIG. 5). Second, the position of such space portion was raised. Both effects were induced by the screening effect and MF deflection of the magnetic layer.

EXAMPLE 3

A test was effected substantially as in example 1, but with a bi-axial main sensor oriented in order to measure the vertical and longitudinal components of the MF. Such set-up is effective in application with ABS systems, especially when a modulation in the magnetization along the emitters is induced.

Upon a braking, both a vertical and a longitudinal deformation appeared. Components of the MF along those directions measured by the main sensor grew accordingly, being zero at unstrained conditions. Such deformations were the results of the inertial forces due to the deceleration process and the grip of the tyre with the road.

The measure of the longitudinal deformation is an indirect measure of such grip or more in general of the grip conditions. In particular, should an estimate of the grip be an issue, it can be evaluated by, coupling: an accelerometer, which measures the value of the inertial forces, or any other means capable of measuring the deceleration forces, with the system 100, which monitors the maximum longitudinal deformation achievable before adherence losses, set in. The less the maximum deformation is large the smaller is the grip opposing to the inertial forces. The same scheme can be applied with any other means capable of measuring the deceleration forces.

EXAMPLE 4

A test was made substantially as in example 1, but with a modulation in the magnetization of the two circular tape-shaped emitters. This modulation can be obtained by periodically surmounting the tapes with blocks of the same magnetic rubber with the same width, about 3.0 cm long and about 0.15 cm thick, or by cutting longer pieces of tapes, about 20 cm long, and putting them circumferentially inside the tyre as in example 1 but spaced of about 7 cm. The rubber of these blocks was charged much less than in the tapes (charging of roughly 50-100 phr). The major effect of such modulation was to induce a small variation mostly sinusoidal in the MF measured by the main sensor, and the appearance of longitudinal components of MF varying accordingly. By measuring the variations of the longitudinal component by a tri-axial main sensor the rotation of a wheel was monitored along with accelerations and decelerations of said wheel during the traveling other than the vertical and lateral deformations. Such information was used, in an ABS, system. The system of the invention appeared to be suitable, for this application. Assuming tyres of 40.0 cm of radius, the circumference (i.e. the length of tapes) is L=2.51 m. Having a modulation wavelength of λ=L/10~25 cm, a car running at a speed of 100 Km/h have tyres rotating with frequency $v_R$=11.11 Hz. Then the magnetic field changes with a frequency of $v_L$=10 $v_R$=111.1 Hz; therefore a sampling of few cycles, i.e. few hundredths of seconds was found to measure a variation in the angular velocity of the wheel.

EXAMPLE 5

A test was made circumferentially positioning a tape-shaped magnetic field emitter upon the rim and another one upon, the inner surface of the tyre; and precisely upon the liner, as it is shown in FIG. 8. The magnetic field emitters are magnetized as disclosed in the previous examples. A SSP appeared in a radially internal position with respect to the rim in correspondence, of the footprint area, displaced slightly aside with respect to those of example 1. In this test, magnetic field emitter on the rim behaved like pivot, while, that on the tyre was free to move following the tyre deformations. A variation of the magnetic field following the deformation was monitored as in example 1. Such set-up can, be useful in cases where size of brake disks or temperatures are an issue, or when magnetic field intensity is to be, increased.

EXAMPLE 6

A test was effected substantially analogously to that of example 5, but with three magnetic field emitters (NdFeB tapes). One of the tapes was placed upon the rim, while the other two were put upon the liner, as shown in FIG. 9. In such case two SSP appeared, positioned above the rim, like in example 6, but at opposite side of the brake disk. Such configuration is interesting for ABS systems in conjunction with a modulated magnetization along the tapes.

Reference is made to FIGS. 10A to 10D. In those figures a frontal cross-section of two magnetic field emitters, differently magnetized, and their associated space portions SP where at least a composite magnetic field component is substantially null, are represented. Special space portions are also provided wherein special symmetry properties of the magnetic field are present, namely in the special space portions all the composite magnetic field components, are null. Apparently, any space portion, because of the substantially cylinder symmetry of a tyre and a wheel (with respect to axis AX), is actually a space region substantially delimited by two parallel planes P1 and P2. At least one special space portion SSP, where all the magnetic field components are substantially null, can be comprised within the space portion SP, having a substantially toroidal-shape. In FIGS. 10A-10D only a section of the toroidal-shaped special, space portions is shown. Such a special space portion is in the space portion SP bordered by the two parallel planes. In case of non continuous magnetized emitters or in case of elongated non-continuously magnetized emitters, the special space portion SSP is an interrupted substantially toroidal-shaped space portion.

In FIGS. 10A and 10B the magnetization M1 and M2 of the two MF emitters is in the same direction whilst it is of different values. In principle, two substantially toroidal special space portions are created but only one (that radially internal to the tyre, the one of lower radius with respect to AX) can be exploited for placing the main sensor 102. In FIGS. 10C and 10D the magnetization M1 and M2 of the two MF emitters is in different directions and of different values. In this case, only one substantially toroidal shape special space portions SSP is created. Such a special space portion can be exploited for placing the main sensor 102.

Advantageously, the main and secondary sensors 102, 103 can be connected by wire to a processing unit. The cable/wire connection can comprise a standard RS232 or CAN bus. A single secondary sensor can be provided for all the wheels of a vehicle.

The invention claimed is:

1. A method for monitoring deformations in a tyre of a vehicle wheel, the wheel comprising the tyre and a rim, the method comprising:
providing the wheel with at least two magnetic-field emitters mutually disposed so as to yield a composite magnetic field having one or more space portions where at least one component of the composite magnetic field is substantially null;
disposing at least one main magnetic-field sensor substantially in one of the one or more space portions;
monitoring variation of the at least one component of the composite magnetic field; and
correlating the variation with tyre deformations;
wherein at least one of the magnetic-field emitters is disposed in contact with the tyre.

2. The method of claim 1, wherein the at least one main magnetic-field sensor is disposed in a special space portion where all components of the composite magnetic field are substantially null.

3. The method of claim 1, wherein the at least two magnetic-field emitters generate a composite magnetic field having an intensity greater than or equal to 0.01 Gauss and less than or equal to 10 Gauss.

4. The method of claim 1, wherein the variation is correlated using a linear relation.

5. The method of claim 1, wherein the variation is correlated using a quadratic relation.

6. The method of claim 1, wherein the variation is monitored in three spatial directions; and
wherein the variation is correlated in the three spatial directions.

7. The method of claim 1, further comprising:
disposing at least one magnetic lens:
in a circumferentially and radially external position with respect to the at least two magnetic-field emitters; and
in radially internal position with respect to any metal structure of the tyre.

8. The method of claim 1, wherein the at least one main magnetic-field sensor disposed in a non-rotating portion of the vehicle.

9. The method of claim 1, further comprising:
disposing at least one secondary magnetic-field sensor so as to cooperate with the at least one main magnetic-field sensor.

10. A system for monitoring deformations in a tyre of a vehicle wheel, comprising:
the wheel;
at least two magnetic-field emitters mutually disposed in the wheel so as to yield a composite magnetic field having one or more space portions where at least one component of the composite magnetic field is substantially null; and
at least one main magnetic-field sensor;
wherein the wheel comprises:
the tyre; and
a rim;
wherein at least one of the magnetic-field emitters is disposed in contact with the tyre, and
wherein the at least one main magnetic-field sensor is disposed substantially in one of the one or more space portions.

11. The system of claim 10, wherein the at least one magnetic-field emitter disposed in contact with the tyre is disposed in a crown portion of the tyre.

12. The system of claim 10, wherein the at least two magnetic-field emitters are disposed in contact with the tyre.

13. The system of claim 10, wherein at least one of the magnetic-field emitters is disposed in a radially internal position with respect to any metal structure of the tyre.

14. The system of claim 10, wherein the at least two magnetic-field emitters are elongated elements.

15. The system of claim 10, wherein the at least two magnetic-field emitters are disposed substantially along a circumference of the wheel.

16. The system of claim 10, wherein each of the magnetic-field emitters has a form selected from:
a single piece; or
multiple pieces.

17. The system of claim 10, wherein the at least two magnetic-field emitters are made of magnetic rubber, and
wherein the magnetic rubber comprises:
a polymer or polymer blend; and
at least one magnetic material.

18. The system of claim 17, wherein the tyre comprises a liner, and
wherein the polymer or polymer blend has an elastic modulus at least 10% lower than an elastic modulus of the liner.

19. The system of claim 17, wherein the polymer or polymer blend comprises halogen-butyl rubbers.

20. The system of claim 17, wherein the polymer or polymer blend comprises halogenated isobutylene-isoprene rubber.

21. The system of claim 17, wherein the at least one magnetic material is present in the magnetic rubber in an amount greater than or equal to 50 phr and less than or equal to 400 phr.

22. The system of claim 17, wherein the at least one magnetic material is a hard magnet material.

23. The system of claim 17, wherein the at least one magnetic material has an isotropic magnetization.

24. The system of claim 17, wherein the at least one magnetic material has an intrinsic coercivity greater than or equal to 100 kA/m.

25. The system of claim 17, wherein the at least one magnetic material has a residual induction (Br) greater than 0.6 Tesla.

26. The system of claim 17, wherein the at least one magnetic material has a Curie temperature greater than 300° C.

27. The system of claim 10, wherein the at least two magnetic-field emitters are magnetized uniformly.

28. The system of claim 10, wherein a magnetic modulation is induced in the at least two magnetic-field emitters.

29. The system of claim 10, further comprising:
at least one magnetic lens.

30. The system of claim 29, wherein the at least one magnetic lens comprises soft magnetic material.

31. The system of claim 29, wherein a single magnetic lens is provided for the at least two magnetic-field emitters.

32. The system of claim 10, wherein the at least one main magnetic-field sensor is disposed in a non-rotating portion of the vehicle.

33. The system of claim 10, wherein the at least one main magnetic-field sensor is mono-axial, bi-axial or tri-axial.

34. The system of claim 10, further comprising:
at least one secondary magnetic-field sensor.

35. The system of claim 34, wherein the at least one secondary magnetic-field sensor is disposed at least 20 cm away from the at least one main magnetic-field sensor.

36. The system of claim 34, wherein the at least one secondary magnetic-field sensor is disposed less than 3 cm away from the at least one main magnetic-field sensor.

37. The system of claim 34, wherein the at least one secondary magnetic-field sensor cooperates with multiple main magnetic-field sensors.

38. The system of claim 34, wherein the at least one secondary magnetic-field sensor is mono-axial, bi-axial, or tri-axial.

39. The system of claim 34, wherein the at least one secondary magnetic-field sensor is oriented in a manner substantially analogous to:
a corresponding main magnetic-field sensor; or
corresponding main magnetic-field sensors.

* * * * *